(12) United States Patent
Rasmussen et al.

(10) Patent No.: US 11,473,995 B2
(45) Date of Patent: Oct. 18, 2022

(54) SYSTEM AND METHOD FOR WIRELESS WATER LEAK DETECTION

(71) Applicant: THE DETECTION GROUP, INC., Sunnyvale, CA (US)

(72) Inventors: Jens Rasmussen, Sunnyvale, CA (US); Glen Paulus, Sunnyvale, CA (US)

(73) Assignee: THE DETECTION GROUP, INC., Sunnyvale, CA (US)

( * ) Notice: Subject to any disclaimer, the term of this patent is extended or adjusted under 35 U.S.C. 154(b) by 89 days.

(21) Appl. No.: 16/876,903

(22) Filed: May 18, 2020

(65) Prior Publication Data

US 2020/0278269 A1  Sep. 3, 2020

Related U.S. Application Data

(63) Continuation-in-part of application No. 16/176,442, filed on Oct. 31, 2018, now abandoned.

(51) Int. Cl.
*G01M 3/28* (2006.01)
*G08B 21/20* (2006.01)
*F17D 5/06* (2006.01)

(52) U.S. Cl.
CPC ............ *G01M 3/2807* (2013.01); *F17D 5/06* (2013.01); *G08B 21/20* (2013.01)

(58) Field of Classification Search
CPC ......... G01M 3/2087; F17D 5/06; G08B 21/20
USPC ........................................ 340/605
See application file for complete search history.

(56) References Cited

U.S. PATENT DOCUMENTS

| 7,900,647 | B2 | 3/2011 | Tornay |
| 8,174,398 | B2 | 5/2012 | Wien |
| 8,188,873 | B2 | 5/2012 | Barth et al. |
| 8,922,379 | B1 * | 12/2014 | Meyer ............. G08B 25/14 340/521 |
| 9,298,191 | B2 | 3/2016 | Meyer |
| 9,303,782 | B2 | 4/2016 | Stoltz et al. |
| D867,187 | S * | 11/2019 | Rasmussen ............ D10/101 |
| 2002/0033759 | A1 | 3/2002 | Morello |
| 2003/0066340 | A1 | 4/2003 | Hassenflug |
| 2006/0267758 | A1 | 11/2006 | Barth et al. |
| 2007/0044539 | A1 * | 3/2007 | Sabol ................. G06Q 10/06 73/19.01 |

(Continued)

FOREIGN PATENT DOCUMENTS

GB          2546486 A     7/2017

*Primary Examiner* — Jack K Wang
(74) *Attorney, Agent, or Firm* — Nath, Goldberg & Meyer; Jerald L. Meyer; Morgan D. Rosenberg (57) ABSTRACT

The system and method for wireless water leak detection provides for manual prevention of external action, such as an external alarm and/or valve shut-off, if a leak sensor can be reached by a respondent within a pre-set time threshold. Upon detection of a leak by a leak sensor, a local alarm, such as an audible alarm or the like, is initiated. Additionally, at the time of detection, a first time is recorded. A first alarm signal is transmitted from the leak sensor to a base station. The first alarm signal includes data representative of the recorded first time. If manual input is not received by the leak sensor within a pre-set time threshold measured from the first time, then the base station transmits a second alarm signal to at least one external device, and may further wirelessly transmit a shut-off signal to a valve controller for closing an associated valve.

17 Claims, 5 Drawing Sheets

(56) References Cited

U.S. PATENT DOCUMENTS

| | | | |
|---|---|---|---|
| 2014/0275876 A1 | 9/2014 | Hansen et al. | |
| 2014/0343736 A1 | 11/2014 | Meyer | |
| 2016/0241988 A1* | 8/2016 | Slevin | H04W 4/70 |
| 2017/0039841 A1* | 2/2017 | Wilson | G08B 25/002 |
| 2017/0357275 A1* | 12/2017 | Smith | G08B 25/08 |
| 2018/0270548 A1* | 9/2018 | Richter | H04Q 9/00 |
| 2018/0275011 A1* | 9/2018 | Saidi | G05D 7/0635 |
| 2018/0291911 A1* | 10/2018 | Ward | F04F 5/10 |
| 2019/0025150 A1* | 1/2019 | Picardi | G01M 3/2807 |
| 2019/0094099 A1* | 3/2019 | Tinaphong | G08B 21/20 |
| 2019/0304290 A1* | 10/2019 | Atkins | G08B 25/003 |

* cited by examiner

SYSTEM AND METHOD FOR WIRELESS WATER LEAK DETECTION

CROSS-REFERENCE TO RELATED APPLICATION

This application is a continuation-in-part of U.S. patent application Ser. No. 16/176,442, filed on Oct. 31, 2018.

BACKGROUND

1. Field

The disclosure of the present patent application relates to leak detection, and particularly to a system and method for wireless water leak detection which allows for manual prevention of external action, such as an external alarm and/or valve shut-off, if a leak sensor can be reached by maintenance personnel, for example, within a pre-set time threshold.

2. Description of the Related Art

Although wireless leak detection systems are relatively common, such systems typically suffer from a lack of on-site human intervention. In a typical wireless leak detection system, a leak sensor, upon detection of a leak, automatically and instantaneously transmits a wireless signal, initiating a global alarm and/or shut-off of a valve. Although this automated process instantly takes action to prevent leak-related damage, there are numerous occasions when such an alarm and/or valve shut-off is not warranted. For example, due to the automated nature of typical wireless leak detection systems, accidentally splashed water or cleaning of a floor can cause the alarm to be transmitted and/or cause the valve to be automatically closed, thus wasting the time and energy of responding personnel. Thus, a system and method for wireless water leak detection solving the aforementioned problems is desired.

SUMMARY

The system and method for wireless water leak detection provides for manual prevention of external action, such as an external alarm and/or valve shut-off, if a leak sensor can be reached by maintenance personnel, for example, within a pre-set time threshold. Upon detection of a leak by a leak sensor, a local alarm, such as an audible alarm or the like, is initiated. Additionally, at the time of detection, a first time is recorded.

A first alarm signal is transmitted from the leak sensor to a base station. The first alarm signal includes data representative of the recorded first time. If manual input is not received by the leak sensor within a pre-set time threshold measured from the first time, then the base station transmits a second alarm signal to at least one external device. The base station may further wirelessly transmit a shut-off signal to a valve controller for closing an associated valve. It should be understood that a wide variety of different configurations are possible, including the usage of multiple leak sensors, multiple groupings of leak sensors, multiple corresponding valve controllers, and multiple base stations.

In an alternative embodiment, a group of leak sensors may be defined, such that a threshold number of leak sensors in the group may be selected for generating a shut-off signal for at least one valve associated with the group. As an example, in a group of 15 leak sensors, the user may select a minimum threshold of five. Thus, in order for at least one valve associated with the group to be shut off automatically, five leak sensors of the group would all have to detect a leak. It should be understood that the threshold may be set to one, thus requiring only a single leak sensor to detect the leak in order to automatically shut off the at least one valve. Similarly, a threshold value equal to the total number of leak sensors in the group may be selected, requiring all leak sensors in the group to detect the leak before the at least one valve is shut off automatically.

In use, after the user sets the threshold number of leak sensors in the group of leak sensors, and upon detection of a leak by a number of leak sensors of the group (where the number may equal one or more), a determination is made whether or not the number of the leak sensors making the detection is equal to or greater than the threshold number of the leak sensors in the group. If the number of detecting leak sensors is equal to or greater than the threshold number of the leak sensors in the group of leak sensors, then at least one valve associated with the group of leak sensors is shut off. The determination may be made control logic operating within any suitable component of the system, including but not limited to, a controller associated with at least one valve controller, similar to the valve controller described above, internal controllers associated with each leak sensor, communicating with one another, within a controller associated with a communication hub linking the leak sensors, or within a controller associated with the base station. Similarly, the control signal to actuate the valve controller to shut off the at least one valve may be generated within the valve controller itself, or may be wirelessly transmitted thereto from the hub, the base station or one or more of the leak sensors.

It should be understood that the above embodiment may operate as a stand-alone system for automatically shutting off at least one valve dependent upon a preset number of leak sensors detecting a leak, or it may be incorporated into the previous embodiment; i.e., upon detection of a leak by at least one leak sensor of the group, a local alarm, such as an audible alarm or the like, is initiated. Additionally, at the time of detection, a first time is recorded.

A first alarm signal is transmitted from the at least one leak sensor to the base station. The first alarm signal includes data representative of the recorded first time. If manual input is not received by the at least one leak sensor within a pre-set time threshold measured from the first time, then the base station transmits a second alarm signal to the at least one external device, and if the number of leak sensors of the group is equal to or greater than the threshold number of the leak sensors in the group, then a shut-off signal is wirelessly transmitted from the base station to the valve controller.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
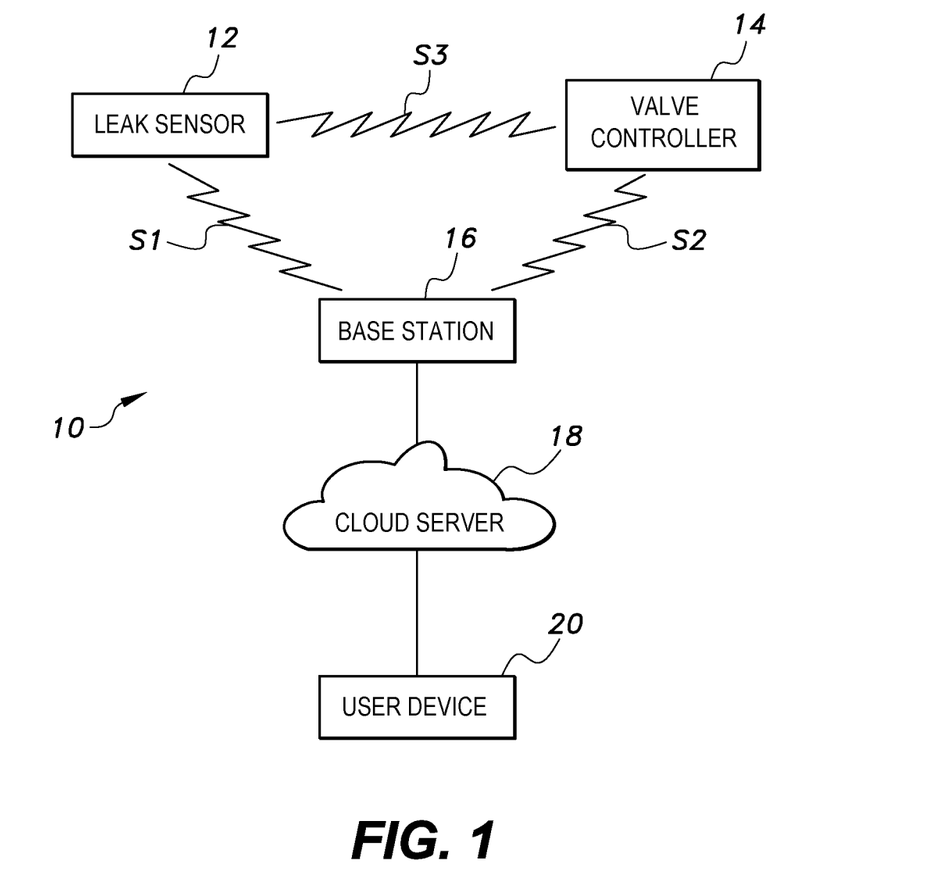
FIG. 1 diagrammatically illustrates a system for wireless water leak detection.
Figure 2:
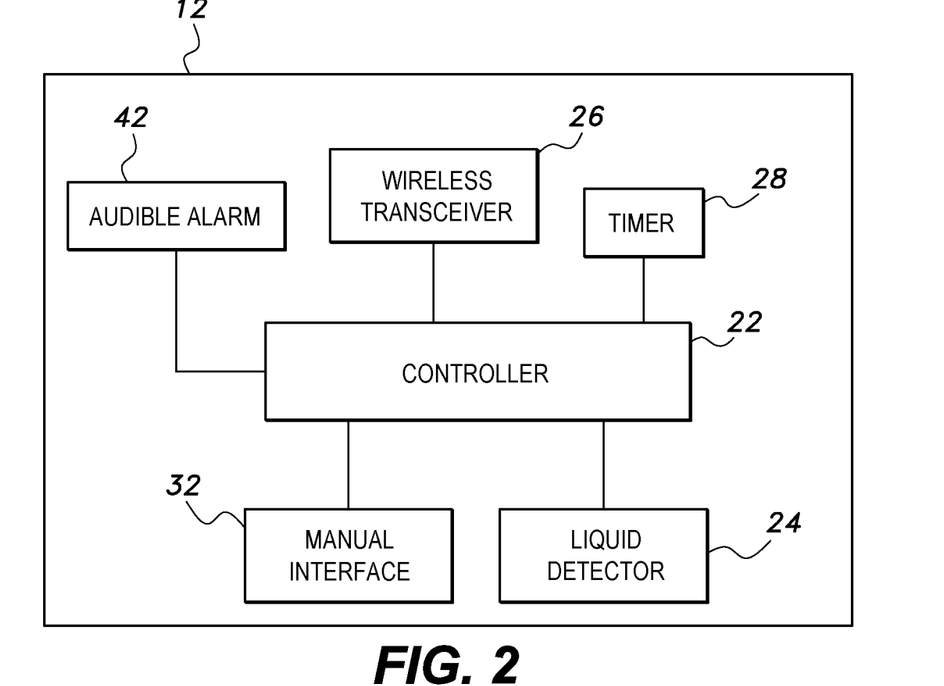
FIG. 2 is a block diagram illustrating components of a leak sensor of the system for wireless water leak detection.

The system and method for wireless water leak detection provides for manual prevention of external action, such as an external alarm and/or valve shut-off, if a leak sensor 12 can be reached by maintenance personnel (or any other suitable respondent) within a pre-set time threshold. In general, it is understood that the embodiments described herein are for exemplary purposes and are not meant to be limiting to the claimed subject matter. Various non-limiting embodiments may contain all of the components described herein, or may contain more or fewer components without deviating from the scope of the disclosed subject matter. In a non-limiting example as shown in FIG. 1, the system for wireless water leak detection 10 includes, in addition to leak sensor 12, a valve controller 14 and a base station 16. As shown in FIG. 2, leak sensor 12 includes a controller 22, a liquid detector 24, a wireless transceiver 26, a timer 28, memory 30, a manual interface 32, and a local alarm 42. It should be understood that controller 22 may be any suitable type of processor, programmable logic controller, control circuitry or the like. Further, it should be understood that timer 28 and/or memory 30 may be integrated into controller 22 or may be in communication therewith by any suitable type of bus, as is well known in the art. Additionally, although only a single leak sensor 12, a single associated valve controller 14, and a single base station 16 are shown in FIG. 1, it should be understood that this is for purposes of simplification and illustration only. As will be explained in greater detail below with respect to the embodiments of FIGS. 5 and 6, alternative arrangements involving multiple leak sensors and/or multiple sub-groups of leak sensors, are also contemplated. Further, it should be understood that multiple base stations may be provided with different groupings of leak sensors and/or differing valve controllers being in communication with differing ones of the multiple base stations.

It should be further understood that liquid detector 24 may be any suitable type of detector for detection of a leak, as is well known in the art. Upon detection of a leak by liquid detector 24, local alarm 42 is initiated. Local alarm 42 may be an audible alarm delivered by a speaker or the like, as is well known in the art, or may be any other suitable type of local alarm for indicating to those in the vicinity of leak detector 12 that a leak has been detected. At the time of detection, a first time is recorded in memory 30. It should be understood that memory 30 may be any suitable type of computer readable and programmable memory, and, in a particular non-limiting embodiment, is a non-transitory, computer readable storage medium.

Figure 4:
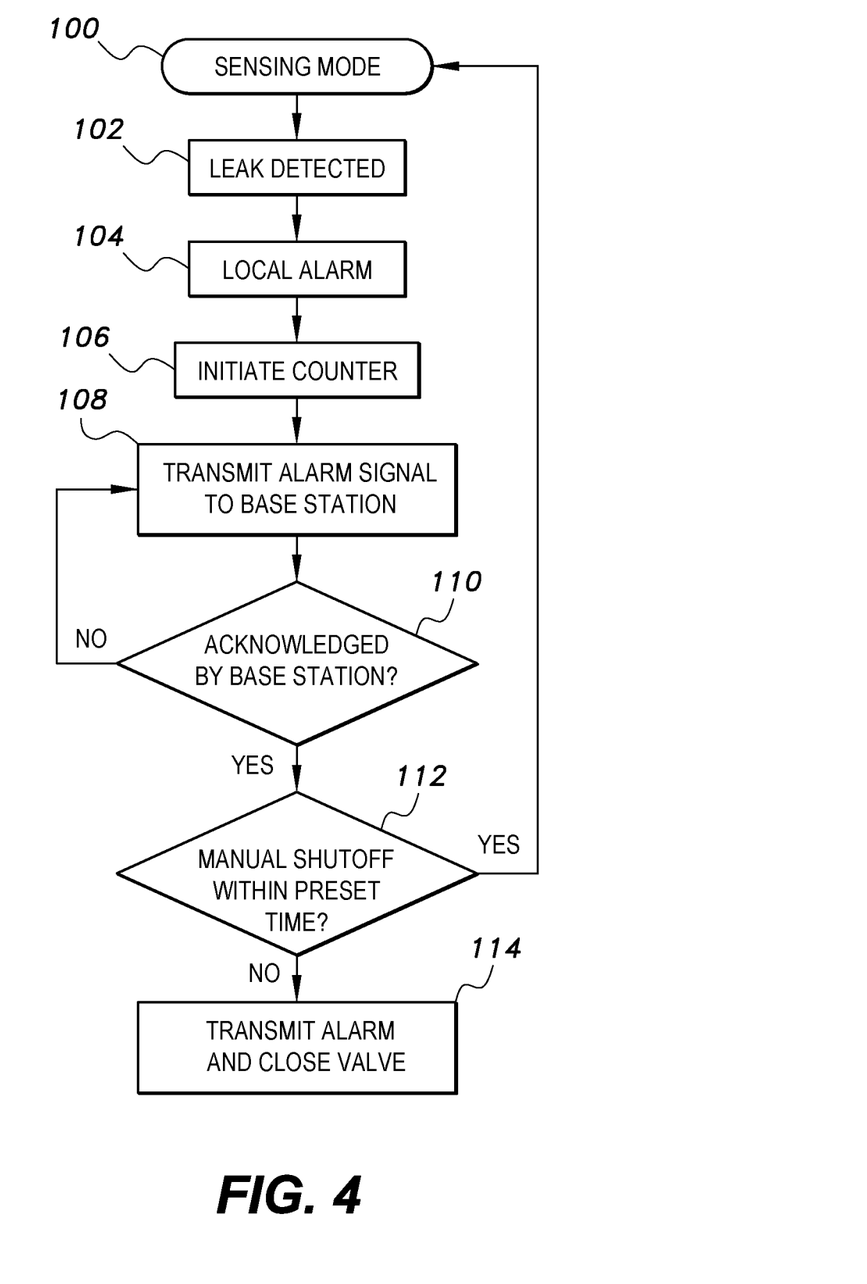
FIG. 4 is a flow chart depicting steps of a method for wireless water leak detection.

With reference to FIG. 4, in step 100, leak sensor 12 is initially in a sensing mode. In this mode, no action is being taken other than liquid detector 24 being in an operational state to detect liquid. When the leak is detected at step 102, local alarm 42 is initiated, such as through generation of an audible "squawk" or the like (step 104), and timer 28 initiates a counter (step 106), beginning from the first time recorded in memory 30. It should be understood that controller 22 operates to initiate and control each of these steps.

Figure 3:
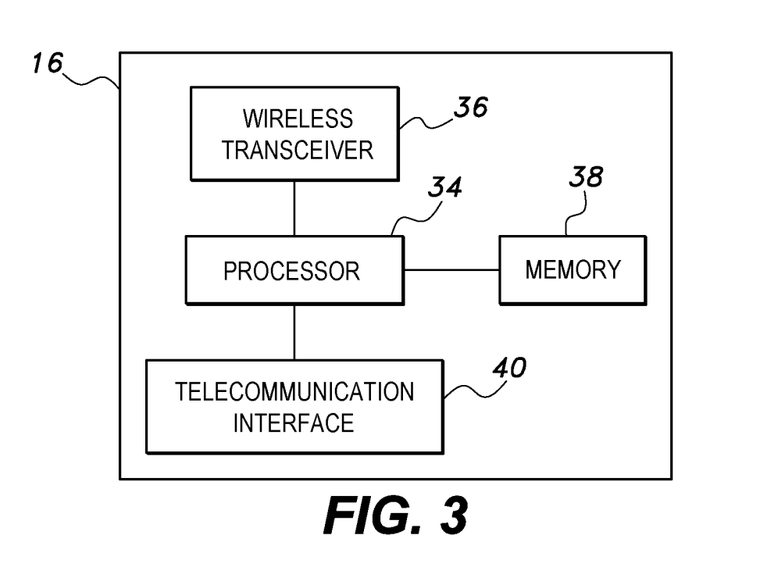
FIG. 3 is a block diagram illustrating components of a base station of the system for wireless water leak detection.

Controller 22 then generates a first alarm signal to be transmitted by wireless transceiver 26 (step 108). The first alarm signal is represented by signal S1 in FIG. 1. It should be understood that wireless transceiver 26 may be any suitable type of transceiver for transmitting and receiving wireless signals. The first alarm signal includes data representative of the recorded first time. As shown in FIG. 3, base station 16 includes a processor 34, associated memory 38, a wireless transceiver 36 and a telecommunication interface 40. It should be understood that processor 34 may be any suitable type of processor, controller, control circuitry or the like. Similarly, it should be understood that memory 38 may be any suitable type of computer readable and programmable memory, and is preferably a non-transitory, computer readable storage medium. The first alarm signal is received by wireless transceiver 36 of base station 16. It should be understood that wireless transceiver 36 may be any suitable type of transceiver for transmitting and receiving wireless signals.

As indicated by step 110 of FIG. 4, base station 16, upon receipt of the first alarm signal, transmits an acknowledgement signal back to leak sensor 12. If leak sensor 12 does not receive the acknowledgement signal within a pre-determined amount of time, leak sensor 12 re-transmits the first alarm signal. A desired number of return loops can be programmed such that leak sensor 12 does not transmit the first alarm signal enough times to cause strain or congestion on the local wireless network. For example, leak sensor 12 may be programmed to transmit the first alarm signal five times (assuming that no acknowledgment signal is received) and then cease for a pre-determined interval. As a non-limiting example, after five unacknowledged transmissions, leak sensor 12 can be programmed to go into a sleep mode for five minutes and then transmit the first alarm signal again.

The local alarm 42 is provided in leak sensor 12 so that maintenance personnel, or any other suitable type of respondent in the vicinity of leak sensor 12, can take action if a leak is detected. In order to prevent any further action, such as sending an alarm to personnel who are off-site, for example, the local respondent can enter manual input to leak sensor 12 via a manual interface 32, which may be a button, for example, mounted on the housing of leak sensor 12. As indicated in step 112 of FIG. 4, this manual input must be received within a pre-set time threshold, with the time being measured, from the recorded first time, by timer 28.

If the manual input is entered within the pre-set threshold, then leak sensor 12 returns to its sensing mode (step 100) and the local alarm 42 is deactivated. However, if the manual input is not received by the leak sensor 12 within a pre-set time threshold, then the base station 16 transmits a second alarm signal to at least one external device. The base station 16 may further wirelessly transmit a shut-off signal S2 to a valve controller 14 for closing an associated valve to shut off flow through the pipes associated with the leak (step 114).

In FIG. 1, base station 16 is shown in communication with a cloud server 18 for transmitting the second alarm signal to a user device 20. It should be understood that telecommunication interface 40 of base station 16 may be any suitable type of interface for communicating with any suitable type of local area or wide area network. It should be further understood that user device 20 represents one or more of any suitable type of device which is external to the building or location in which system 10 is installed. User device 20 may be, for example, a laptop computer, a smartphone or the like, allowing the second alarm signal to reach off-site personnel.

Figure 5:
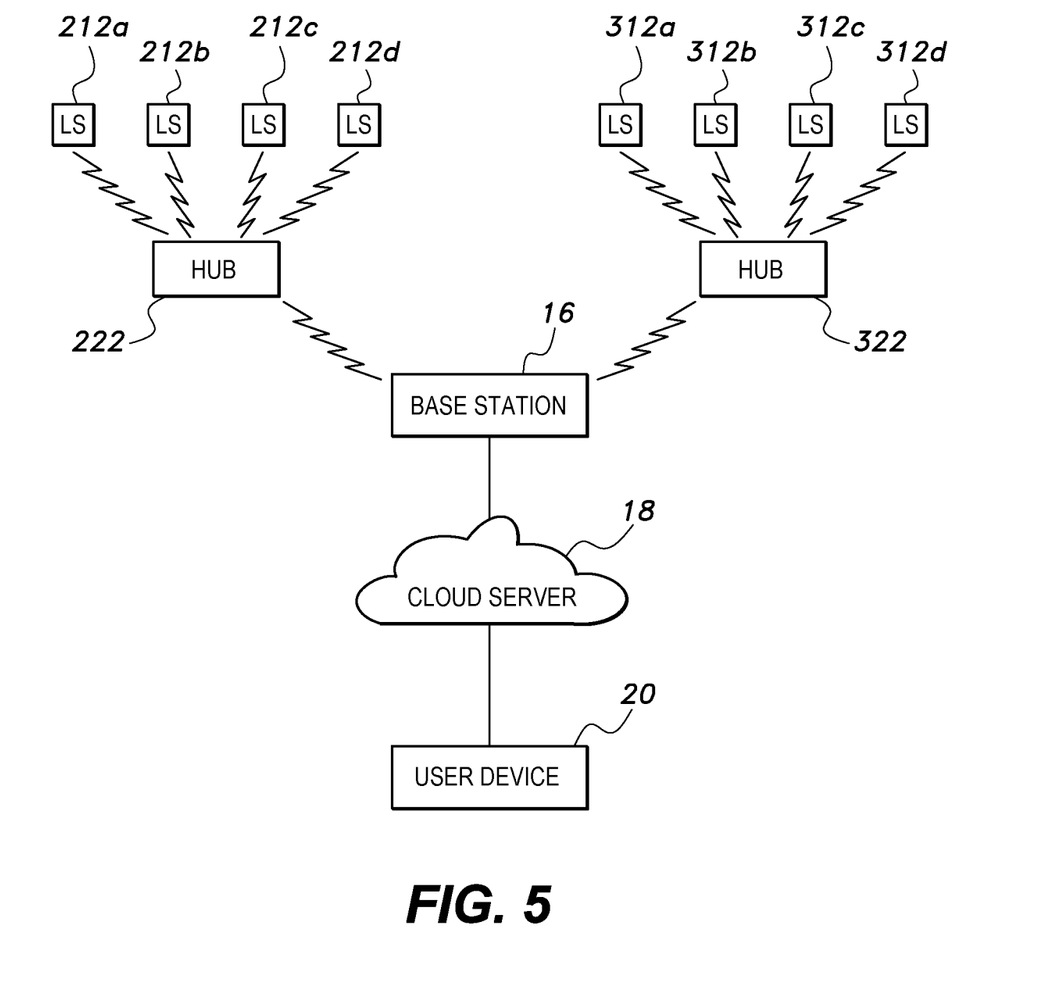
FIG. 5 diagrammatically illustrates an alternative embodiment of the system for wireless water leak detection.

Returning to FIG. 1, it should be understood that single leak sensor 12 is shown for purposes of illustration only. As shown in FIG. 5, groupings of multiple leak sensors (LSs)

may be provided. For example, a first group of leak sensors 212a, 212b, 212c, 212d may be provided on one floor of a building, and a second group of leak sensors 312a, 312b, 312c, 312d may be provided on another floor of the building. Here, each group of leak sensors is shown communicating wirelessly with a corresponding communication hub 222, 322, respectively. Each of hubs 222, 322 may be associated with the particular floor of the building for each of the respective groups of leak sensors. Hubs 222, 322 act as communication intermediaries for transmitting the wireless signals between the first and second groups of leak sensors and base station 16. Further, as discussed above, the usage of multiple base stations is also contemplated. In such a situation, the multiple stations may communicate with corresponding ones of the hubs (either in one-to-one correspondence, or with groups of hubs communicating with a selected base station), or the multiple hubs may be replaced with, or integrated with, base stations.

In addition to the basic operation described above, additional times may be recorded in order to generate an overall incident log with accurate time reporting. For example, a second time may be recorded which is indicative of a time when the leak is no longer detected by liquid detector 24 of leak sensor 12. A third time may be recorded which is indicative of a time when the manual input has been received via manual interface 32 of leak sensor 12. As a further example, a fourth time may be recorded which is indicative of a time when the initial sensing mode of the leak sensor (step 100) is reinitiated. It should be understood that the second time and the third time may occur in any order.

Each of the second, third and fourth times, as described above, may be transmitted from leak sensor to base station 16. Thus, each of the recorded times is stored both in memory 30 of leak sensor 12, and also in memory 38 of base station 16. Thus, although base station 16 typically prepares and records the overall event log, leak sensor 12 also maintains an event log in the event of transmission failure. Further, system 10 can be programmed to transmit additional signals indicative of any of these conditions. For example, upon recordation of the second time, a signal may be transmitted to user device 20 to indicate that the sensed leak has been cleared; i.e., it is no longer present. It should be further understood that users may access the event log, as well as perform programming of system 10, through the connection of base station 16 with cloud server 18; i.e., users may input and retrieve data from base station 16 through user device(s) 20, either on-site or off-site.

It should be understood that the pre-set time threshold may be any desired programmable duration. The pre-set time threshold may also be set to zero, thus automatically and immediately initiating transmission of the second alarm signal to user device 20 and sending a shut-off signal S3 to valve controller 14. Additionally, it should be understood that once the manual input has been received by leak sensor 12 (step 112), leak sensor 12 does not immediately need to return to the sensing mode of step 100; i.e., a pre-set "lockout" time may be programmed, allowing the user to program a time interval between manual silencing of local alarm 42 and returning to the sensing mode of step 100. During this period, leak sensor is "locked out" and does not sense the presence of liquids. This programmable interval may be used in situations when the sensed area is wet but not due to a leak, such as during cleaning, for example.

It should be further understood that leak sensor 12 may be used in combination with any other desired components and features associated with wireless sensor networks. For example, leak sensor 12 may include a locator device, allowing a local user to easily find leak sensor 12 by initiation of a locating signal. Further, leak sensor 12 may be mounted in a desired area by insertion into a base or holster, allowing for simultaneous mounting and powering/charging of leak sensor 12.

In addition to the basic operation of system 10 described above, it should be understood that system 10 may be programmed to perform a wide variety of different operations. As an example, valve controller 14, either on its own or under the control of base station 16, may be programmed for scheduled valve cycling operations (to prevent "freezing" or sticking of the valve, for example). Valve controller 14 may be self-programmable, manually operable and/or controlled by base station 16 and/or leak sensor 12. As a further example, leak sensor 12 may be programmed to operate in a test mode, allowing the operation of timer 28 to be tested, but without initiation of an external alarm and/or a valve shut-off. Further, since system 10 operates as a wireless sensor network, system 10 may be operated in a data gathering mode, allowing for network communication testing.

Figure 6:
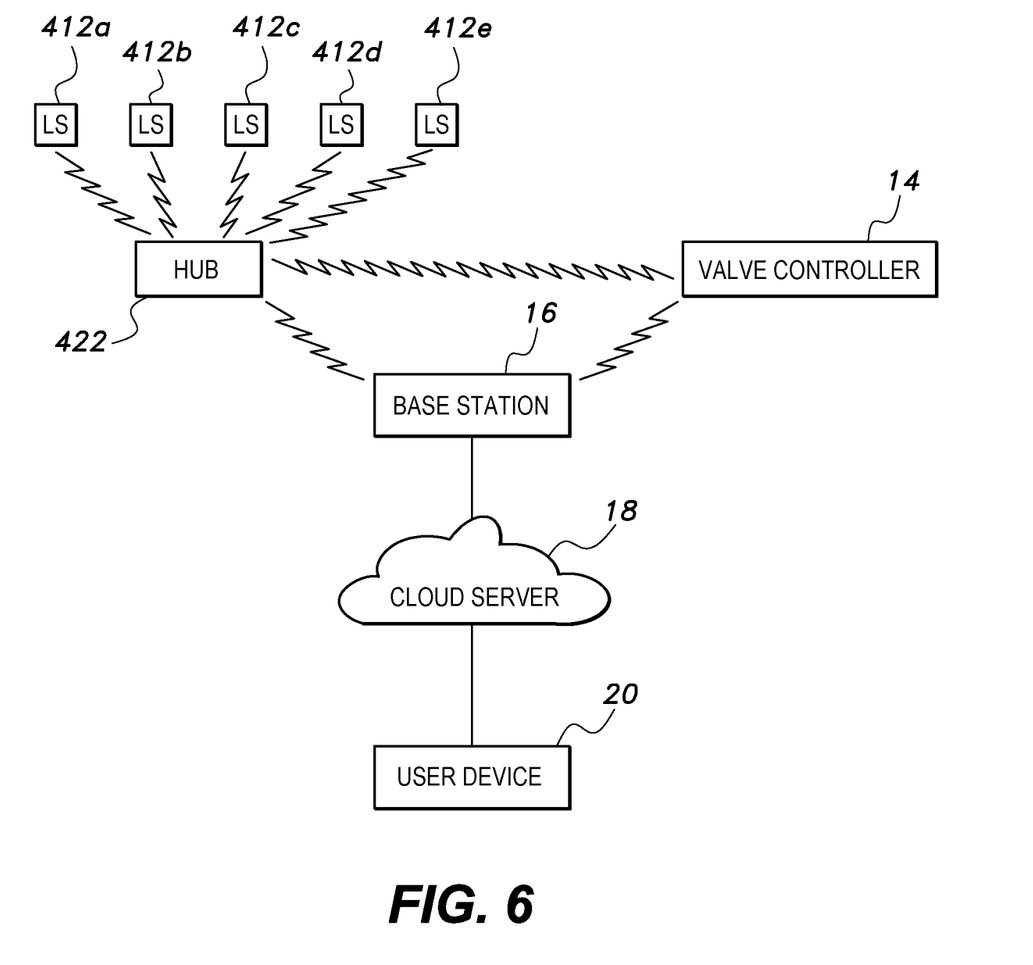
FIG. 6 diagrammatically illustrates a further alternative embodiment of the system for wireless water leak detection.

As described above, a group of leak sensors may be used. In the alternative embodiment of FIG. 6, a group of leak sensors 412a, 412b, 412c, 412d, 412e is defined such that a threshold number of the leak sensors in the group may be selected for generating a shut-off signal for at least one valve associated with the group. It should be understood that the five leak sensors 412a, 412b, 412c, 412d, 412e defining the group in FIG. 6 are show for purposes of illustration and simplification only. As a practical, though non-limiting example, a group of 15 leak sensors may be used. In this non-limiting example, the user may select a minimum threshold of five. Thus, in order for at least one valve associated with the group to be shut off automatically, five of the leak sensors of the group will all have to detect a leak. It should be understood that the threshold may be set to one, thus requiring only a single leak sensor to detect the leak in order to automatically shut off the at least one valve. Similarly, a threshold value equal to the total number of leak sensors in the group may be selected, requiring all leak sensors in the group to detect the leak before the at least one valve is shut off automatically.

In use, after the user sets the threshold number of leak sensors in the group of leak sensors, and upon detection of a leak by a number of leak sensors of the group (where the number may equal one or more), a determination is made whether or not the number of the leak sensors making the detection is equal to or greater than the threshold number of the leak sensors in the group. If the number of detecting leak sensors is equal to or greater than the threshold number of the leak sensors in the group of leak sensors, then at least one valve associated with the group of leak sensors is shut off.

The determination may be made control logic operating within any suitable component of the system, including but not limited to, a controller associated with at least one valve controller 14, similar to the valve controller described above, internal controllers associated with each leak sensor 412a, 412b, 412c, 412d, 412e, communicating with one another, within a controller associated with a communication hub 422 linking the leak sensors 412a, 412b, 412c, 412d, 412e, or within a controller associated with the base station 16. Similarly, the control signal to actuate the valve controller 14 to shut off the at least one valve associated therewith may be generated within the valve controller 14 itself, or may be wirelessly transmitted thereto from the hub 422, the base station 16 or one or more of the leak sensors 412a, 412b, 412c, 412d, 412e.

It should be understood that the embodiment of FIG. 6, as described above, may operate as a stand-alone system for automatically shutting off at least one valve dependent upon a preset number of leak sensors detecting a leak, or it may be incorporated into the previous embodiment; i.e., upon detection of a leak by at least one leak sensor of the group, a local alarm, such as an audible alarm or the like, is initiated. Additionally, at the time of detection, a first time is recorded.

A first alarm signal is transmitted from the at least one leak sensor to the base station 16 (either directly from the leak sensor(s) 412*a*, 412*b*, 412*c*, 412*d*, 412*e* or through hub 422). The first alarm signal includes data representative of the recorded first time. If manual input is not received by the at least one leak sensor within a pre-set time threshold measured from the first time, then the base station 16 transmits a second alarm signal to the at least one external device 20, and if the number of leak sensors of the group is equal to or greater than the threshold number of the leak sensors in the group, then a shut-off signal is wirelessly transmitted from the base station 16 to the valve controller 14.

It is to be understood that the system and method for wireless water leak detection is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for wireless water leak detection, comprising the steps of:
    defining a group of leak sensors;
    selecting a threshold number of leak sensors in the group of leak sensors, wherein the selecting of the threshold number of leak sensors in the group of leak sensors comprises a user selection of the threshold number of leak sensors;
    detecting a leak with at least one leak sensor of the group of leak sensors;
    determining if the at least one leak sensor of the group of leak sensors comprises a number of the leak sensors of the group of leak sensors equal to or greater than the threshold number of the leak sensors in the group of leak sensors; and
    if the at least one leak sensor of the group of leak sensors comprises a number of the leak sensors of the group of leak sensors equal to or greater than the threshold number of the leak sensors in the group of leak sensors, then shutting off at least one valve associated with the group of leak sensors.

2. The method for wireless water leak detection as recited in claim 1, further comprising the steps of:
    initiating a local alarm at the at least one leak sensor;
    recording a first time;
    wirelessly transmitting a first alarm signal to a base station, the first alarm signal including data representative of the first time; and
    if manual input is not received by the at least one leak sensor within a pre-set time threshold measured from the first time, then transmitting a second alarm signal from the base station to at least one external device.

3. The method for wireless water leak detection as recited in claim 2, wherein the step of initiating the local alarm comprises initiating an audible alarm at the at least one leak sensor.

4. The method for wireless water leak detection as recited in claim 2, further comprising the step of recording a second time indicative of a time when the leak is no longer detected by the at least one leak sensor.

5. The method for wireless water leak detection as recited in claim 2, further comprising the step of recording a third time indicative of a time when the manual input has been received by the at least one leak sensor.

6. The method for wireless water leak detection as recited in claim 2, further comprising the step of recording a fourth time indicative of a time when an initial sensing mode of the at least one leak sensor is reinitiated.

7. The method for wireless water leak detection as recited in claim 2, further comprising the step of ceasing the local alarm when the manual input is received by the at least one leak sensor.

8. The method for wireless water leak detection as recited in claim 1, further comprising the step of wirelessly transmitting an acknowledgement signal from the base station to the at least one leak sensor upon receipt of the first alarm signal.

9. The method for wireless water leak detection as recited in claim 1, wherein the step of selecting the threshold number of leak sensors in the group of leak sensors comprises selecting a threshold number greater than one.

10. A method for wireless water leak detection, comprising the steps of:
    defining a group of leak sensors;
    selecting a threshold number of leak sensors in the group of leak sensors, wherein the selecting of the threshold number of leak sensors in the group of leak sensors comprises a user selection of the threshold number of leak sensors;
    detecting a leak with at least one leak sensor of the group of leak sensors;
    initiating a local alarm at the at least one leak sensor;
    recording a first time;
    wirelessly transmitting a first alarm signal to a base station, the first alarm signal including data representative of the first time;
    determining if the at least one leak sensor of the group of leak sensors comprises a number of the leak sensors of the group of leak sensors equal to or greater than the threshold number of the leak sensors in the group of leak sensors;
    if manual input is not received by the leak sensor within a pre-set time threshold measured from the first time, then transmitting a second alarm signal from the base station to at least one external device; and
    if the at least one leak sensor of the group of leak sensors comprises a number of the leak sensors of the group of leak sensors equal to or greater than the threshold number of the leak sensors in the group of leak sensors, then wirelessly transmitting a shut-off signal from the base station to a valve controller.

11. The method for wireless water leak detection as recited in claim 10, wherein the step of initiating the local alarm comprises initiating an audible alarm at the at least one leak sensor.

12. The method for wireless water leak detection as recited in claim 10, further comprising the step of recording a second time indicative of a time when the leak is no longer detected by the at least one leak sensor.

13. The method for wireless water leak detection as recited in claim 10, further comprising the step of recording a third time indicative of a time when the manual input has been received by the at least one leak sensor.

14. The method for wireless water leak detection as recited in claim 10, further comprising the step of recording a fourth time indicative of a time when an initial sensing mode of the at least one leak sensor is reinitiated.

15. The method for wireless water leak detection as recited in claim 10, further comprising the step of ceasing the local alarm when the manual input is received by the at least one leak sensor.

16. The method for wireless water leak detection as recited in claim 10, further comprising the step of wirelessly transmitting an acknowledgement signal from the base station to the at least one leak sensor upon receipt of the first alarm signal.

17. The method for wireless water leak detection as recited in claim 9, wherein the step of selecting the threshold number of leak sensors in the group of leak sensors comprises selecting a threshold number greater than one.

\* \* \* \* \*